United States Patent [19]
Lee

[11] Patent Number: 6,019,009
[45] Date of Patent: Feb. 1, 2000

[54] DRIVERLESS VEHICLE OPERATING SYSTEM FOR A VEHICLE EQUIPPED WITH A MANUAL TRANSMISSION

[75] Inventor: Dong Min Lee, Suwon, Rep. of Korea

[73] Assignee: Hyundai Motor Co., Seoul, Rep. of Korea

[21] Appl. No.: 09/069,983

[22] Filed: Apr. 30, 1998

[51] Int. Cl.[7] ............................................... F16H 59/00
[52] U.S. Cl. ........................................... 74/335; 74/336 R
[58] Field of Search ................................ 74/335, 336 R; 474/473

[56] References Cited

U.S. PATENT DOCUMENTS

| | | | |
|---|---|---|---|
| 4,554,824 | 11/1985 | King et al. | 73/117 |
| 4,790,177 | 12/1988 | King et al. | 73/117 |
| 5,060,541 | 10/1991 | Shimanaka | 74/866 |
| 5,219,391 | 6/1993 | Edelen et al. | 74/335 |
| 5,832,777 | 11/1998 | Weilant | 74/335 |

FOREIGN PATENT DOCUMENTS

| | | |
|---|---|---|
| 0 377848 | 7/1990 | European Pat. Off. . |
| 50-78753 | 6/1975 | Japan . |
| 55-42291 | 10/1980 | Japan . |

*Primary Examiner*—Charles A Marmor
*Assistant Examiner*—Tisha D. Waddell

[57] ABSTRACT

A driverless vehicle operating system for controlling operation of a vehicle equipped with a manual transmission includes a shift control mechanism controlling operation of a shift lever for the manual transmission, a clutch control mechanism controlling operation of a clutch, which operationally connects the manual transmission and an engine of the vehicle, and an accelerator pedal control mechanism controlling operation of an accelerator pedal of the vehicle. The system also includes an operator input device, an engine speed sensor, and a vehicle speed sensor. An electronic control unit receives input from the shift control mechanism, the clutch control mechanism, the accelerator pedal control mechanism, the operator input device, the engine speed sensor and the vehicle speed sensor, and controls the shift control mechanism, the clutch control mechanism, and the accelerator pedal control mechanism based on the received input. The shift control mechanism includes a first pair of parallel shift rails disposed on either side of a shift lever for the manual transmission, and a second pair of parallel shift rails disposed on either side of the shift lever. The second pair of parallel shift rails are perpendicular to the first pair of parallel shift rails. A first rotary shaft operationally is connected to the first pair of parallel shift rails, and a second rotary shaft operationally is connected to the second pair of parallel shift rails. A first motor rotates the first rotary shaft, and a second motor rotates the second rotary shaft.

20 Claims, 5 Drawing Sheets

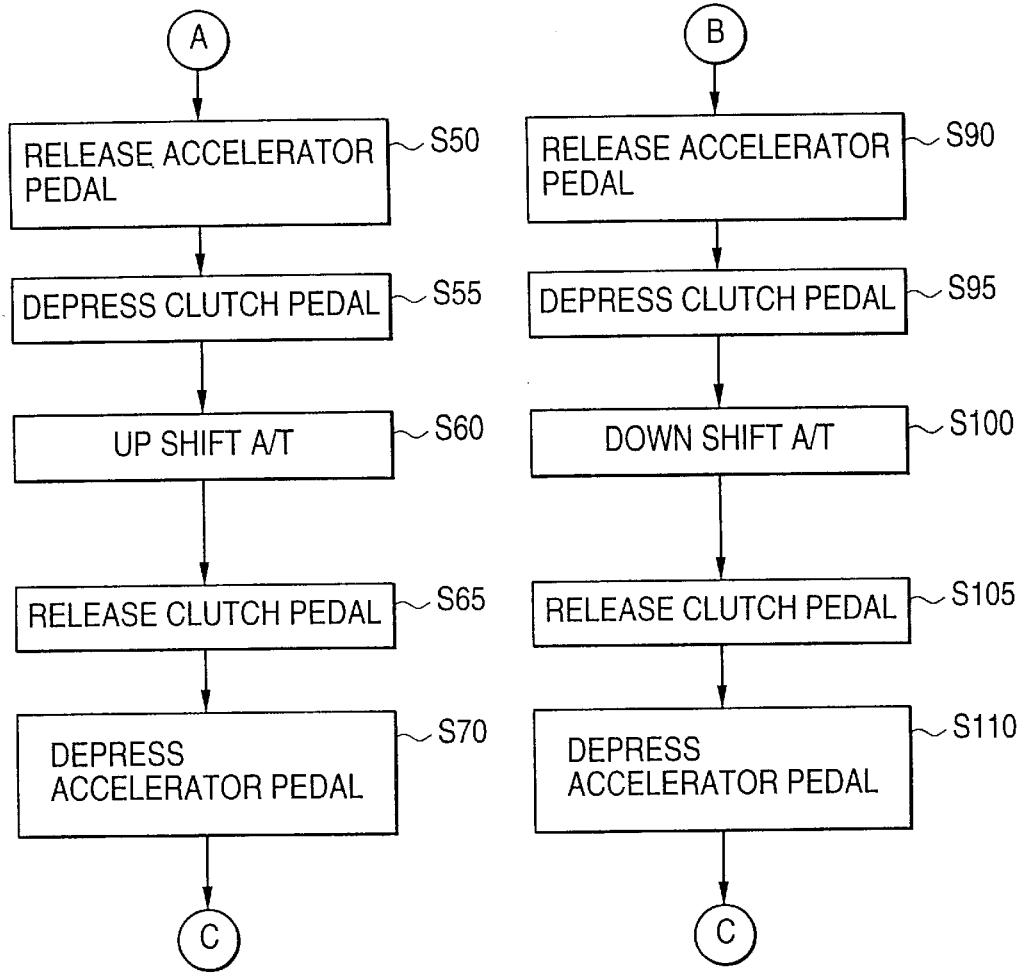

DRIVERLESS VEHICLE OPERATING SYSTEM FOR A VEHICLE EQUIPPED WITH A MANUAL TRANSMISSION

BACKGROUND OF THE INVENTION

1. Field of the Invention

The present invention relates to a driverless vehicle operating system for a vehicle equipped with a manual transmission.

2. Description of Related Art

Generally, it is cumbersome for a driver to operate a vehicle equipped with a manual transmission. Compared to a vehicle equipped with an automatic transmission, the driver must additionally operate a clutch and a gear shift lever. Furthermore, to ensure smooth shifts, a certain amount of skill is required in operating the accelerator pedal.

Even when a driver does become skillful with a vehicle equipped with a manual transmission, a driver can occasionally and mistakenly downshift or upshift causing either great shift shock or loss of power.

As a result, the use of automatic transmission systems in vehicles has become increasingly popular. These automatic transmission systems, however, utilize torque converters which are less efficient in transmitting power from the engine than a manually operated clutch. As a result, automatic transmissions which use torque converters typically consume fuel at a much higher rate than vehicles equipped with manual transmissions.

SUMMARY OF THE INVENTION

It is an object of the present invention to provide an automatic shifting system for a vehicle equipped with a manual transmission.

It is a further object of the present invention to provide an automatic shifting system which decreases fuel consumption.

A still further object of the present invention is to provide an automatic shifting system which is simple in structure, inexpensive to manufacture, and durable.

These and other objects are achieved by providing a driverless vehicle operating system for controlling operation of a vehicle equipped with a manual transmission, comprising: a shift control mechanism controlling operation of a shift lever for said manual transmission; a clutch control mechanism controlling operation of a clutch, which operationally connects said manual transmission and an engine of said vehicle; an accelerator pedal control mechanism controlling operation of an accelerator pedal of said vehicle; an operator input device receiving operator input; an engine speed sensor sensing a speed of said engine; a vehicle speed sensor sensing a speed of said vehicle; and an electronic control unit receiving input from said shift control mechanism, said clutch control mechanism, said accelerator pedal control mechanism, said operator input device, said engine speed sensor and said vehicle speed sensor, and controlling said shift control mechanism, said clutch control mechanism, and said accelerator pedal control mechanism based on said received input.

These and other objects are further achieved by providing a shift control mechanism for shifting a manual transmission of a vehicle, comprising: a first pair of parallel shift rails disposed on either side of a shift lever for said manual transmission; a second pair of parallel shift rails disposed on either side of said shift lever, said second pair of parallel shift rails being perpendicular to said first pair of parallel shift rails; a first rotary shaft operationally connected to said first pair of parallel shift rails; a second rotary shaft operationally connected to said second pair of parallel shift rails; a first motor rotating said first rotary shaft; and a second motor rotating said second rotary shaft.

These and other objects are also achieved by providing a method of controlling operation of a vehicle equipped with a manual transmission, comprising: (a) receiving operator input; (b) sensing a speed of an engine of said vehicle; (c) sensing a speed of said vehicle; and (d) receiving input from a shift control mechanism, a clutch control mechanism, and an accelerator pedal control mechanism; (e) controlling said shift control mechanism, said clutch control mechanism, and said accelerator pedal control mechanism based on output from said steps (a)–(d). Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6A–6C illustrate a flow chart of the operation of the automatic.

DETAILED DESCRIPTION OF THE PREFERRED EMBODIMENTS

Figure 1:
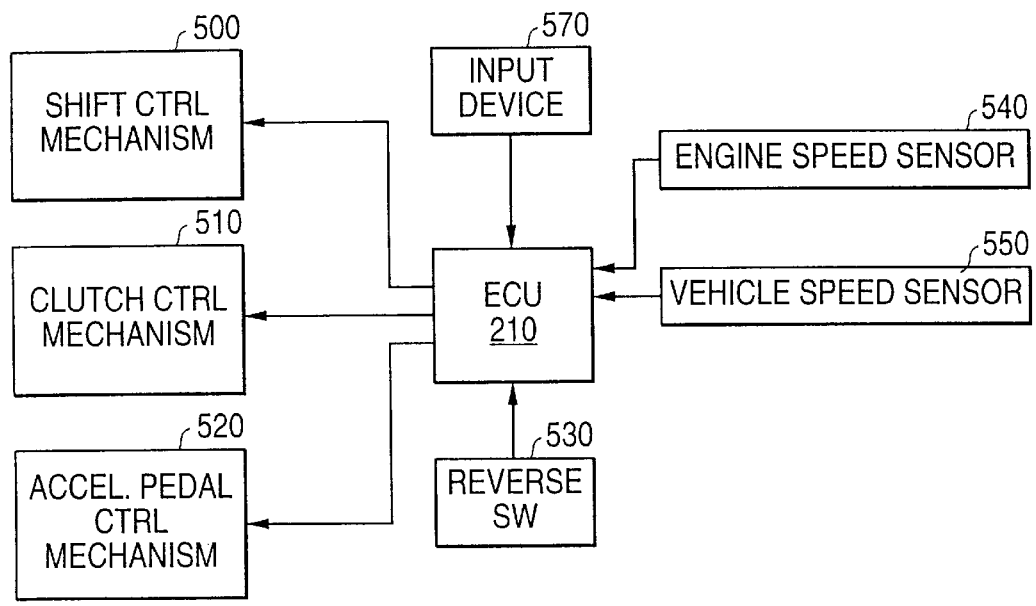
FIG. 1 illustrates the automatic shifting system according to the present invention.

FIG. 1 illustrates a block diagram of the automatic shifting system for a vehicle equipped with a manual transmission according to the present invention. As shown in FIG. 1, the automatic shifting system includes a shift control mechanism 500, a clutch control mechanism 510, and an accelerator pedal control mechanism 520 connected to an electronic control unit (ECU) 210. Sensors within the shift control mechanism 500, the clutch control mechanism 510, and the accelerator pedal control mechanism 520 send their output to the ECU 210, and the ECU 210 sends control signals to elements in the shift control mechanism 500, the clutch control mechanism 510, and the accelerator pedal control mechanism 520. The shift control mechanism 500, the clutch control mechanism 510, and the accelerator pedal control mechanism 520 will be discussed in greater detail below with respect to FIGS. 2–5.

The electronic control unit 210 also receives the output of a reverse switch 530, an engine speed sensor 540, a vehicle speed sensor 550, and an input device 570.

The operation of the automatic shifting system will be described in detail below.

THE SHIFT CONTROL MECHANISM 500

Figure 2:
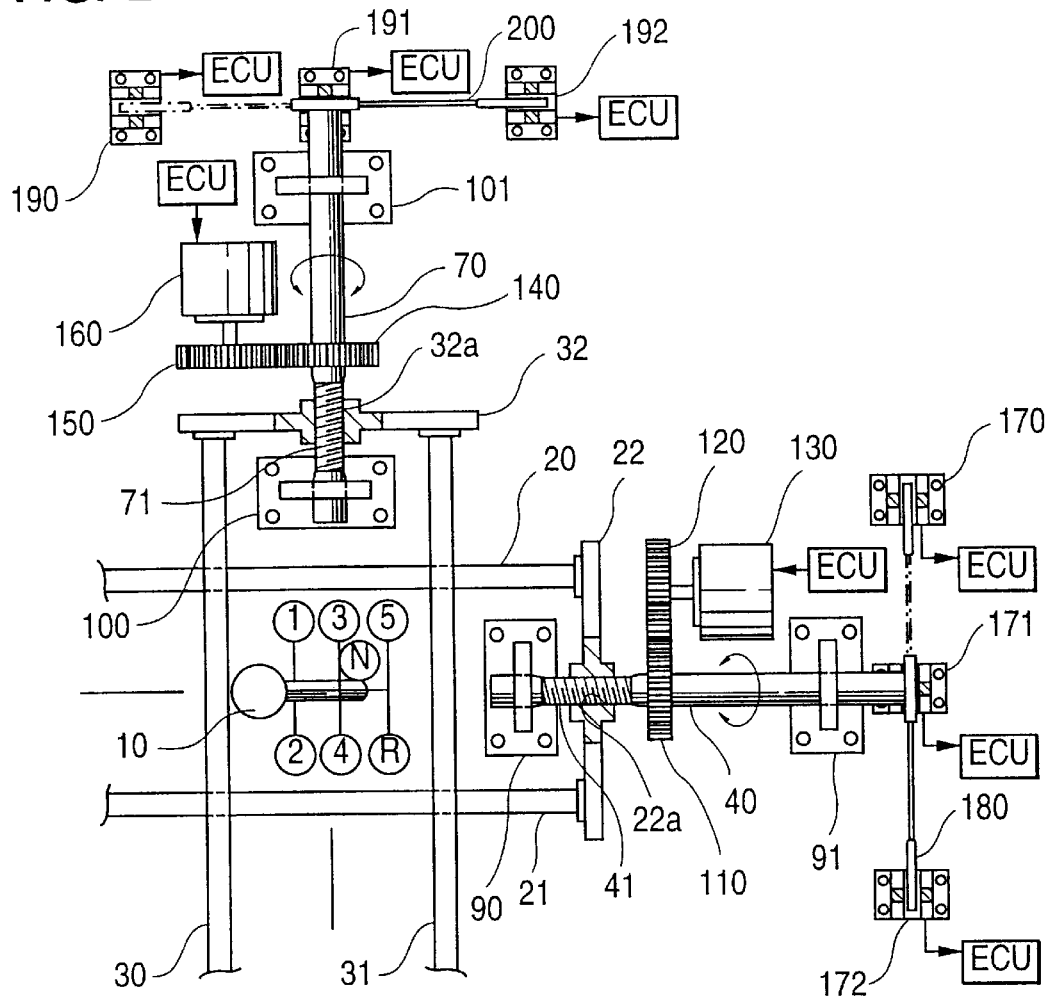
FIG. 2 illustrates the shift control mechanism according to the present invention.

The shift control mechanism 500 will now be described with respect to FIGS. 2–4. As shown in FIG. 2, a first pair of shift rails 20 and 21 are disposed in a first direction parallel to one another and on either side of a gear shift lever 10 of a manual transmission. The manual transmission may be any well known manual transmission, and for the purposes of illustration only, the gearing arrangement of one possible manual transmission has been shown in FIG. 2. A pair of second shift rails 30 and 31 are disposed in a second direction parallel to one another and on either side of the gear shift lever 10. As shown in FIG. 2, the first and second directions are perpendicular to one another, and for the purposes of discussion, the first direction will be referred to as the X-axis direction and the second direction will be referred to as the Y-axis direction.

For the purposes of illustration only, the pair of first shift rails 20 and 21 and the pair of second shift rails 30 and 31 have been illustrated such that the gear arrangement of the example manual transmission could be shown in FIG. 2. In actuality, only a minute gap exists between the gear shift lever 10 and the pairs of first and second shift rails 20, 21, 30, and 31.

A first moving plate 22 is attached to one end of the pair of first shift rails 20 and 21, and a second moving plate 32 is connected to one end of the pair of second shift rails 30 and 31. The shift control mechanism 500 further includes a first driving shaft 40 disposed in the same direction as the pair of first shift rails 20 and 21, and a second driving shaft 70 disposed in the same direction as the pair of second shift rails 30 and 31. The first moving plate 22 includes a first female screw 22a in a gearing relationship with a first male screw 41 disposed on the lower portion of the first driving shaft 40. The first moving plate 22 and the pair of first shift rails 20 and 21 rotate forward or backward according to the clockwise or counterclockwise rotation of the first driving shaft 40.

The second moving plate 32 includes a second female screw 32a in a gearing relationship with a second male screw 71 disposed on the lower portion of the second driving shaft 70. The second moving plate 32 and the pair of second shift rails 30 and 31 rotate forward or backward according to the clockwise or counterclockwise rotation of the second driving shaft 70.

As shown in FIG. 2, the first driving shaft 40 is provided with a pair of first support brackets 90 and 91 for respectively, rotatably receiving the ends of the first driving shaft 40. The second driving shaft 70 is provided with a pair of second support brackets 100 and 101 for respectively, rotatably receiving the ends of the second driving shaft 70. The pairs of first and second support brackets 90, 91, 100, and 101 are fixed to a frame of the vehicle.

The first driving shaft 40 includes a first driven gear 110 attached thereto. The first driven gear 110 is in a gearing relationship with a first driving gear 120 of a first driving motor 130 such that the first driving shaft 40 rotates according to the clockwise or counterclockwise rotation of the first driving motor 130. Similarly, the second driving shaft 70 includes a second driven gear 140 attached thereto. The second driven gear 140 is in a gearing relationship with a second driving gear 150 of a second driving motor 160 such that the second driving shaft 70 rotates according to the clockwise or counterclockwise rotation of the second driving motor 160.

Figure 3:
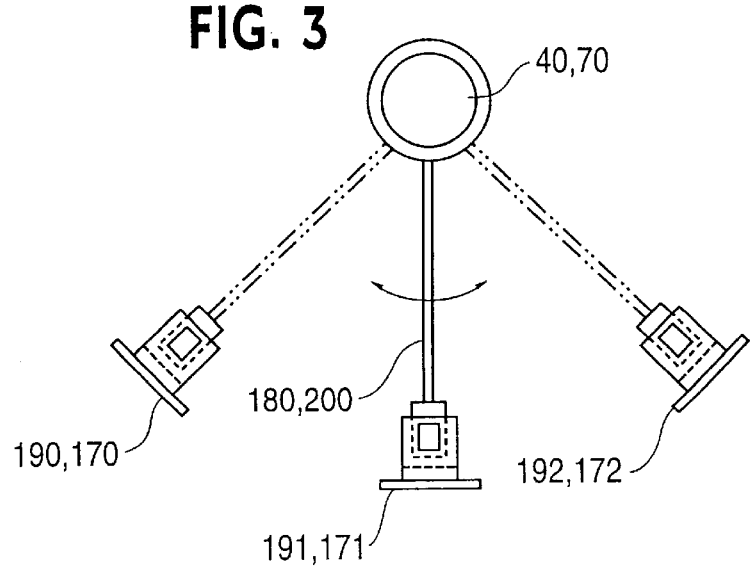
FIG. 3 shows the positioning of the photo-sensors with respect to the driving shafts in the shift control mechanism according to the present invention.

As shown in FIGS. 2 and 3, a first photo-sensor 170, a second photo-sensor 171, and a third photo-sensor 172 are mounted equidistant from and circumferentially about the first driving shaft 40, and lie in the same plane perpendicular to the axis of rotation of the first driving shaft 40. The first and third photo-sensors 170 and 172 are disposed an equal angular distance from the second photo-sensor 171. The first, second, and third photo-sensors 170, 171, and 172 are fixed to the vehicle frame. A first sensing bar 180 is fixed to and extends radially from the first driving shaft 40. The first sensing bar 180 lies in the same plane perpendicular to the first driving shaft 40 as the first, second, and third photo-sensors 170, 171, and 172. As the first driving shaft 40 rotates and the first sensing bar 180 passes through one or more of the first, second, and third photo-sensors 170, 171, and 172, the first sensing bar 180 breaks a light beam created thereby. Accordingly, the first sensing bar 180 and the first, second, and third photo-sensors 170, 171, and 172 form photo-interrupters.

As further shown in FIGS. 2 and 3, a fourth photo-sensor 190, a fifth photo-sensor 191, and a sixth photo-sensor 192 are mounted equidistant from and circumferentially about the second driving shaft 70, and lie in the same plane perpendicular to the axis of rotation for the second driving shaft 70. The fourth and sixth photo-sensors 190 and 192 are disposed an equal angular distance from the fifth photo-sensor 191. The fourth, fifth, and sixth photo-sensors 190, 191, and 192 are fixed to the frame of the vehicle. A second sensing bar 200 is fixed to and extends radially from the second driving shaft 70. The second sensing bar 200 lies in the same plane perpendicular to the second driving shaft 70 as the fourth, fifth, and sixth photo-sensors 190, 191, and 192. As the second driving shaft 70 rotates and the second sensing bar 200 passes through one or more of the fourth, fifth, and sixth photo-sensors 190, 191, and 192, the second sensing bar 200 breaks a light beam created thereby. Accordingly, the second sensing bar 200 and the fourth, fifth, and sixth photo-sensors 190, 191, and 192 form photo-interrupters.

As shown in FIG. 2, the outputs from the first, second, third, fourth, fifth, and sixth photo-sensors 170, 171, 172, 190, 191, and 192 are supplied to the ECU 210. Also, control signals output by the ECU 210 are sent to and control the first driving motor 130 and the second driving motor 160.

The output from the first, second, and third photo-sensors 170, 171, and 172 serves as a first coordinate and the output of the fourth, fifth, and sixth photo-sensors 190, 191, and 192 serves as a second coordinate for determining the position of the gear shift lever 10, and thus the gear that the manual transmission is in. The following table illustrates which of the first-third photo-sensors 170–172 and the fourth-sixth photo-sensors 190–192 outputs a signal in each of the five possible forward speed stages, the reverse stage, and the neutral stage.

TABLE

| Shift Mode/Shift Direction | 1st–3rd Photo-Sensor Output | 4th–6th Photo-Sensor Output |
|---|---|---|
| 1st Stage (forward) | 172 | 192 |
| 2nd Stage (forward) | 170 | 192 |
| 3rd Stage (forward) | 172 | 191 |
| 4th Stage (forward) | 170 | 191 |
| 5th Stage (forward) | 172 | 190 |
| Reverse Stage (backward) | 170 | 190 |
| Neutral Stage (neutral) | 171 | 191 |

Accordingly, based on the output of the first-sixth photo-sensors 170–172 and 190–192, the ECU 210 can determine the current gear stage of the manual transmission. The operation of the shift control mechanism 500 will be discussed in detail below.

Figure 4:
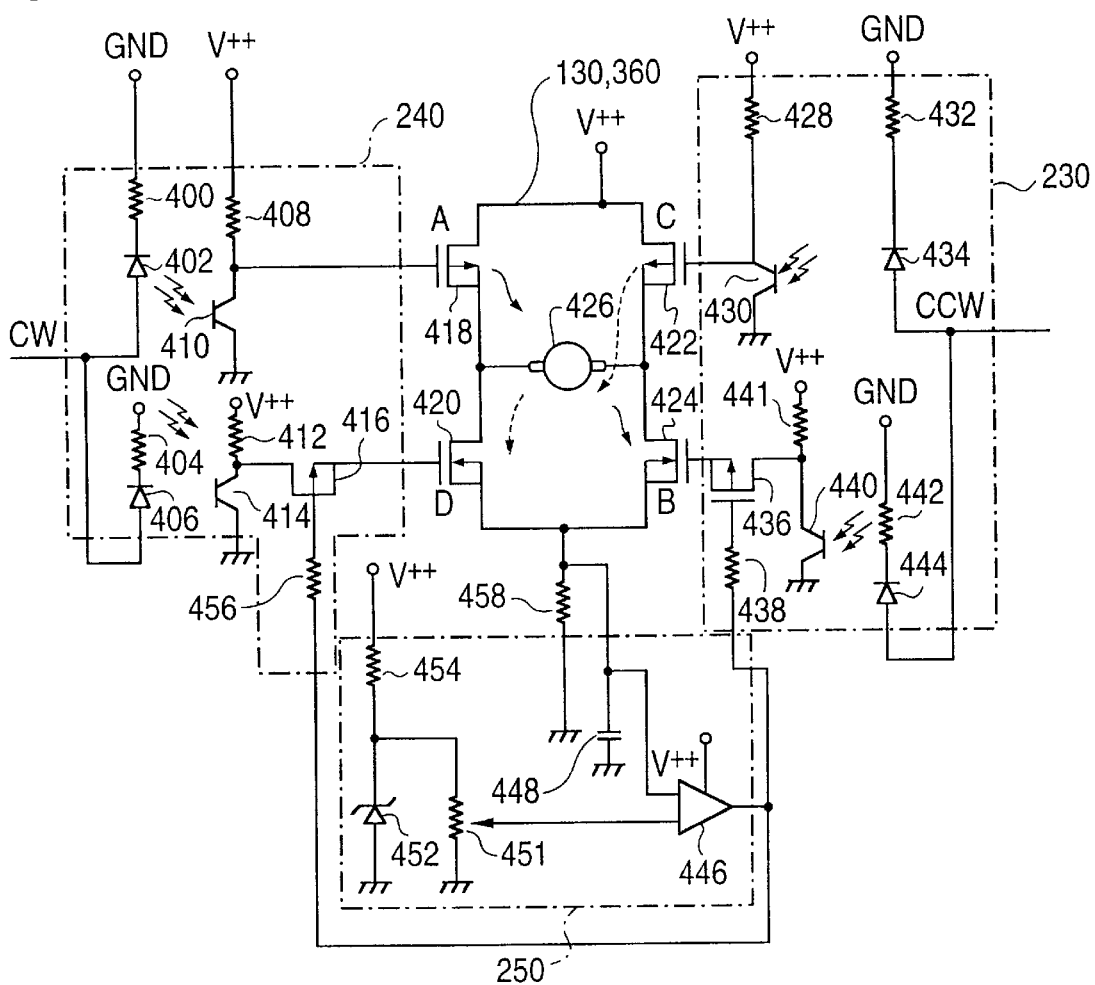
FIG. 4 is a driving circuit in the shift control mechanism according to the present invention.

Referring to FIG. 4, each of the first and second motors 130 and 160 includes a stabilizing circuit for maintaining stable operation of the first and second drive motors 130 and 160.

As shown in FIG. 4, a DC motor 426 (either first drive motor 130 or second drive motor 160) has a first terminal connected to the drains of a first P-MOS transistor 418 and a first N-MOS transistor 420. A second terminal of the DC motor 426 is connected to the drains of a second P-MOS transistor 422 and a second N-MOS transistor 424.

The gates of the first P-MOS and N-MOS transistors 418 and 420 are connected to a clockwise direction control circuit 240, while the gates of the second P-MOS and N-MOS transistors 422 and 424 are connected to a counterclockwise direction control circuit 230. The sources of the first and second N-MOS transistors 420 and 424 are connected to an overflow prevention circuit 250, and are connected to ground via a first resistor 458. The overflow prevention circuit 250 is also connected to both the clockwise direction control circuit 240 and the counterclockwise direction control circuit 230.

A second resistor 400 and a first diode 402 are connected in series to ground. A third resistor 404 and second diode 406 are connected in series to ground as well. Both the anodes of the first and second diodes 402 and 406 receive the clockwise driving signal from the ECU 210.

As further shown in FIG. 4, the clockwise direction control circuit 240 includes a fourth resistor 408 and a first transistor 410 connected in series between a voltage source $V^{++}$ and ground. The first transistor 410 and first diode 402 form a photo-coupler. The connection between the fourth resistor 408 and the first transistor 410 is also connected to the gate of the first P-MOS transistor 418. A fifth resistor 412 and a second transistor 414 are connected in series between the voltage source $V^{++}$ and ground. The second transistor 414 and the second diode 406 form a photo-coupler. The connection between the fifth resistor 412 and the second transistor 414 is also connected to the source of a third P-MOS transistor 416. This third P-MOS transistor 416 has its drain connected to the gate of the first N-MOS transistor 420, and its gate connected to one terminal of a sixth resistor 456. The other terminal of the sixth resistor 456 is connected to the overflow prevention circuit 250.

The counterclockwise direction control circuit 230 has substantially the same structure as the clockwise direction control circuit 240 with seventh resistor 432, third diode 434, eighth resistor 442, fourth diode 444, ninth resistor 428, third transistor 430, tenth resistor 441, fourth transistor 440, fourth P-MOS transistor 436, and eleventh resistor 438 corresponding to second resistor 400, first diode 402, third resistor 404, second diode 406, fourth resistor 408, first transistor 410, fifth resistor 412, second transistor 414, third P-MOS transistor 416, and sixth resistor 456, respectively. The only difference between the counterclockwise direction control circuit 230 and the clockwise direction control circuit 240 is that the anodes of the third diode 434 and fourth diode 444 receive the counterclockwise signal from the ECU 210 as opposed to the clockwise signal.

The overflow prevention circuit 250 includes a comparator 446 having a first input connected to the sources of the first and second N-MOS transistors 420 and 424. A capacitor 448 is connected between the first terminal of the comparator 446 and ground. The overflow prevention circuit 250 also includes a twelfth resistor 454 and a Zener diode 452 connected in series between the voltage source $V^{++}$ and ground. One terminal of a variable resistor 451 is connected to the connection between the twelfth resistor 454 and the Zener diode 452, while the second terminal of the variable resistor 451 is connected to ground. A second terminal of the comparator 446 receives the output of the variable resistor 451.

The operation of the stabilizing circuit shown in FIG. 4 will now be described.

To cause the motor 426 to rotate in the clockwise direction, the ECU 210 outputs a clockwise signal of, for example, zero volts, and a counterclockwise signal of, for example, five volts. To cause the motor 426 to rotate in the counterclockwise direction, the ECU 210 outputs a counterclockwise signal of, for example, zero volts, and a clockwise signal of, for example, five volts.

Because the operation of the stabilizing circuit when rotating the motor 426 in the counterclockwise direction is the opposite of the operation when rotating the motor 426 in the clockwise direction, only operation in the counterclockwise direction will be described.

As discussed above, when rotation in the counterclockwise direction is desired, a five volt clockwise signal is supplied to the anodes of the first and second diodes 402 and 406. Because first diode 402 and first transistor 410 form a photo-coupler, the first transistor 410 turns on. As a result, current flows from the voltage source $V^{++}$ to ground, and the first P-MOS transistor 418 is on.

By contrast, the counterclockwise signal is zero volts such that the third diode 434 does not turn on the third transistor 430. As a result, the second P-MOS transistor 422 is off.

Because the counterclockwise signal is zero volts, the fourth transistor 440 is also off such that a high voltage is supplied to the gate of the second N-MOS transistor 424 via the fourth P-MOS transistor 436. As a result, the second N-MOS transistor 424 is on.

By contrast, the five volts clockwise signal causes the second transistor 414 to turn on, and a low voltage signal is supplied via the third P-MOS transistor 416 to the first N-MOS transistor 420. As a result, the fourth N-MOS transistor 420 turns off, and current flows from the voltage source $V^{++}$ through the first P-MOS transistor 418, the motor 426, the second N-MOS transistor 424, and the first resistor 458 to ground. The current flowing through the motor 426 causes the motor 426 to turn in a counterclockwise direction.

The overflow prevention circuit 250 monitors the current flowing through the motor 426, and prevents current from flowing through motor 426 if that current exceeds a predetermined threshold level. Specifically, the comparator 446 receives a voltage indicative of the current flowing to ground through the motor 426, and compares that voltage to a reference voltage supplied by the variable resistor 451. The reference voltage is set by adjusting the resistance of the variable resistor 451. If the input voltage exceeds the reference voltage, the comparator 446 outputs a signal which turns off the third and fourth P-MOS transistors 416 and 436. Consequently, the first and second N-MOS transistors 420 and 424 are turned off, and current will no longer flow through the motor 426. By setting the reference voltage to a voltage corresponding to a current above which the motor 426 could be damaged, the overflow prevention circuit 250 prevents such current from flowing through the motor 426.

OPERATION OF THE SHIFT CONTROL MECHANISM 500

Next, the operation of the shift control mechanism 500 will be described. First, up shifting from neutral to first, second, third, fourth, and fifth gears will be discussed. Then, shifting from neutral into reverse will be discussed.

When shifting from neutral into first gear, the ECU 210 outputs control signals to the second driving motor 160 such that the second driving motor 160 is driven in a clockwise direction. This causes the second driving shaft 70 to rotate in a counterclockwise direction. As a result, the pair of second shift rails 30 and 31 move the gear shift lever 10 to the left in FIG. 2. When the ECU 210 receives output from the sixth photo-sensor 192, the ECU 210 then sends control signals to stop rotation of the second driving motor 160, and to start rotation of the first driving motor 130 in the clockwise direction. This causes the first driving shaft 40 to rotate in the counterclockwise direction. Accordingly, the pair of first shift rails 20 and 21 move the gear shift lever 10 up in FIG. 2.

When the ECU 210 receives output from the third photo-sensor 172, the ECU 210 outputs control signals to stop rotation of the first driving motor 130. At this point, the ECU 210 receives output from both the third photo-sensor 172 and the sixth photo-sensor 192, and determines that the manual transmission is in first gear.

When shifting into second gear, the ECU outputs control signals to the first driving motor 130 to cause the first driving motor 130 to rotate in a counterclockwise direction. This causes the first driving shaft 40 to rotate in a clockwise direction. As a result, the pair of first shift rails 20 and 21 move the gear shift lever 10 down in FIG. 2. When the ECU 210 receives output from the first photo-sensor 170, the ECU 210 sends control signals to the first driving motor 130 to stop rotation thereof. At this point in time, the ECU 210 receives control signals from both the first photo-sensor 170 and the third photo-sensor 192, and determines that the manual transmission is in second gear.

When shifting to third gear, the ECU 210 outputs control signals to the first driving motor 130 to cause the first driving motor 130 to rotate in the clockwise direction. This causes the driving shaft 40 to rotate in the counterclockwise direction, and the pair of first shift rails 20 and 21 move the gear shift lever 10 up in FIG. 2. When the ECU 210 receives output from the second photo-sensor 171, the ECU 210 outputs control signals to stop the rotation of the first driving motor 130.

Then, the ECU 210 outputs control signals to cause the second driving motor 160 to rotate in the counterclockwise direction. As a result, the second driving shaft 70 rotates in the clockwise direction, and the pair of second shift rails 30 and 31 move the gear shift lever 10 to the right in FIG. 2. When the ECU 210 receives the output of the fifth photo-sensor 191, the ECU 210 outputs control signals to stop the rotation of the second driving motor 160. At this point in time, the ECU 210 receives control signals from both the second photo-sensor 171 and the fifth photo-sensor 191, and determines that the manual transmission is in neutral.

Next, the ECU 210 outputs control signals to cause the first driving motor 130 to rotate in the clockwise direction. As discussed above, this will cause the gear shift lever 10 to move up in FIG. 2. When the ECU 210 receives output from the third photo-sensor 172, the ECU 210 outputs control signals to stop the rotation of the first driving motor 130. At this time, the ECU 210 receives output from the third photo-sensor 172 and the fifth photo-sensor 191, and determines that the manual transmission is in third gear.

Shifting in the fourth gear is accomplished in the same manner as shifting into second gear, except that the manual transmission determines that fourth gear has been achieved when the first photo-sensor 170 and the fifth photo-sensor 191 supply output.

When shifting into fifth gear, the ECU 210 outputs control signals to the first driving motor 130 to rotate the first driving motor 130 in the clockwise direction. This causes the driving shaft 40 to rotate in the counterclockwise direction, and the pair of first shift rails 20 and 21 move the gear shift lever 10 up in FIG. 2. When the ECU 210 receives output from the second photo-sensor 171, the ECU 210 outputs control signals to stop the rotation of the first driving motor 130.

Then, the ECU 210 outputs control signals to cause the driving motor 160 to rotate in the counterclockwise direction. As a result, the second driving shaft 70 rotates in the clockwise direction, and the pair of second shift rails 30 and 31 move the gear shift lever 10 to the right in FIG. 2. When the ECU 210 receives the output of the fourth photo-sensor 190, the ECU 210 outputs control signals to stop the rotation of the second driving motor 160.

Next, the ECU 210 outputs control signals to cause the first driving motor 130 to rotate in the clockwise direction. This causes the gear shift lever 10 to move up in FIG. 2. When the ECU 210 receives output from the third photo-sensor 172, the ECU 210 outputs control signals to stop the rotation of the first driving motor 130. At this time, the ECU 210 receives output from the third photo-sensor 172 and the fourth photo-sensor 190, and determines that the manual transmission is in fifth gear.

To shift into reverse, first the gear shift 10 is placed in neutral, if not already in neutral, and then the ECU 210 outputs control signals to the second driving motor 160 to cause the second driving motor 160 to rotate in the counterclockwise direction. This causes the driving shaft 70 to rotate in the clockwise direction. As a result, the pair of second shift rails 30 and 31 move the gear shift lever 10 to the right in FIG. 2. When the ECU 210 receives output from the fourth photo-sensor 190, the ECU 210 outputs control signals which cause the second driving motor 160 to stop rotating.

Then, the ECU 210 outputs control signals to the first driving motor 130 which cause the first driving motor 130 to rotate in the counterclockwise direction. As a result, the first driving shaft 40 rotates in the clockwise direction, and the pair of first shift rails 20 and 21 move the gear shift lever 10 down in FIG. 2. When the ECU 210 receives output from the first photo-sensor 170, the ECU 210 outputs control signals which cause the first driving motor 130 to stop rotating. At this point in time, the ECU 210 receives output signals from both the first photo-sensor 170 and the fourth photo-sensor 190, and determines that the transmission is in reverse.

Downshifting or shifting from reverse into neutral occurs in the reverse order as discussed above. Accordingly, the description of downshifting will not be described. Additionally, besides sequential shifting, skip shifting can be performed, and the control sequence therefor is readily apparent from the discussion above.

THE CLUTCH CONTROL MECHANISM 510

Figure 5:
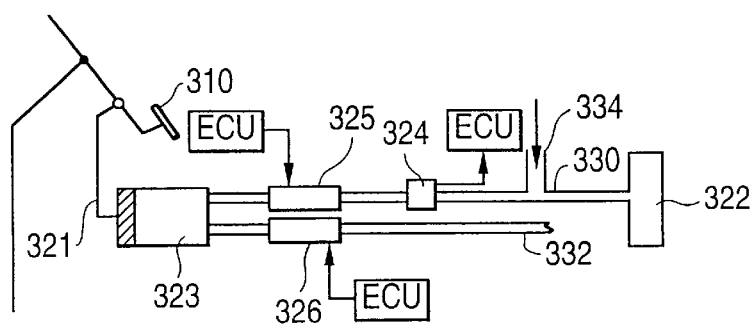
FIG. 5 is a diagram of the clutch control mechanism according to the present invention.

FIG. 5 illustrates the clutch control mechanism 510 according to the present invention. As shown, a piston 321 of a hydraulic cylinder 323 is connected to a clutch pedal 310 of the vehicle. The cylinder 323 is coupled to a vacuum pump 322 via a vacuum passage 330, and is supplied with air pressure via air pressure passage 332. A vacuum created by the vacuum pump 322 is communicated to the cylinder 323 by the vacuum passage 330. The vacuum created by the vacuum pump 322 is supported by a further vacuum supplied by auxiliary vacuum port 334. The auxiliary vacuum port 334 connects the vacuum passage 330 to a vacuum chamber (not shown) operated by an alternator (not shown).

A first solenoid valve 325 is disposed in the vacuum passage 330, and controls whether or not the vacuum created by the vacuum pump 322 is applied to the cylinder 323. A second solenoid valve 326 is disposed in the air pressure passage 332, and controls whether or not air pressure is supplied to the cylinder 323. A pressure sensor 324 is also disposed in the vacuum passage 330.

As shown in FIG. 5, the pressure sensor 324 outputs pressure measurements to the ECU 210, and the ECU 210 supplies control signals to the first and second solenoids 325 and 326 and the vacuum pump 322.

OPERATION OF CLUTCH CONTROL MECHANISM 510

The operation of the clutch control mechanism 510 will now be described.

When a shift is to take place, the ECU 210 causes the vacuum pump 322 to operate, opens first solenoid valve 325, and closes second solenoid valve 326. As a result, the vacuum created by the vacuum pump 322 communicates with the cylinder 323 causing the piston 321 to move in the direction of the vacuum. The movement of the piston 321 causes the clutch pedal 310 to depress and disengage the clutch of the manual transmission. The ECU 210 judges that the clutch pedal has been fully depressed when the output of the pressure sensor 324 falls below a first predetermined threshold. When the ECU 210 judges the clutch pedal fully depressed, the ECU 210 controls the shift control mechanism 500 to perform a shift operation.

Once the shift control mechanism 500 has completed shifting the manual transmission, the ECU 210 turns off the vacuum pump 322, closes the first solenoid valve 325 and begins to open second solenoid valve 326. Because air pressure received via air pressure passage 332 is supplied to the cylinder 323, the piston rod 321 moves away from the supply of air pressure. The movement of the piston 321 causes the clutch pedal 310 to rise, and the clutch to become engaged. The ECU 210 judges that the clutch pedal is fully released, and the clutch engaged, when the output from the pressure sensor 324 exceeds a second predetermined threshold.

ACCELERATOR PEDAL CONTROL MECHANISM 520

The accelerator pedal control mechanism 520 has the same structure as clutch control mechanism 510. As with the clutch control mechanism 510, the ECU 210 controls movement of an accelerator pedal connected to the cylinder 323 by controlling the first and second solenoid valves 325 and 326 based, in part, on the output of the pressure sensor 324 in the accelerator pedal control mechanism 520.

OPERATION OF DRIVERLESS VEHICLE OPERATING SYSTEM

Figure 6A:
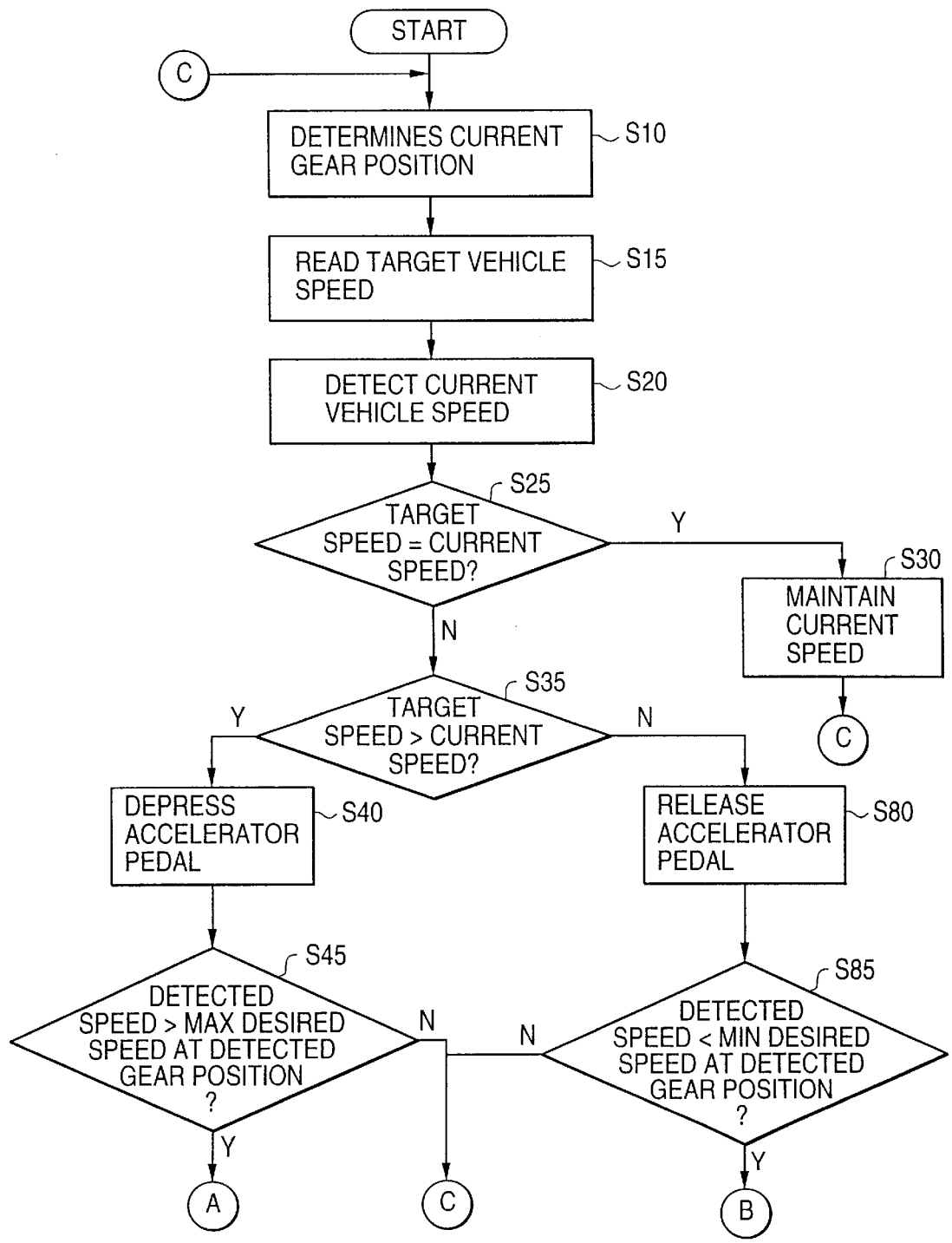

The operation of the automatic shifting system illustrated in FIG. 1 will now be described with respect to the flow chart illustrated in FIGS. 6A–6C. Referring to FIG. 6A, in step S10, the ECU 210 determines the current gear position based on the output of the engine speed sensor 540 and the vehicle speed sensor 550 in any well-known manner. Next, in step S15 the ECU 210 reads the target vehicle speed entered by an operator via the input device 570. The input device 570 may, for example, be a personal computer connected to the ECU 210.

Processing proceeds to step S20 where the ECU 210 inputs the output from the vehicle speed sensor 550. Then, in step S25, the ECU 210 determines whether the target speed read in step S15 equals the current vehicle speed read in step S20. If equal, the ECU 210 determines to maintain the current speed in step S30, and processing returns to step S10.

If, however, the target speed does not equal the current vehicle speed, the ECU 210 determines in step S35 whether the target speed is greater than the current vehicle speed. If greater, the ECU 210 instructs the accelerator pedal control mechanism 520 to depress the accelerator pedal. Then, in step S45 the ECU 210 inputs the output of the vehicle speed sensor 550, and determines whether the detected vehicle speed is greater than a predetermined maximum desired speed at the gear position determined in step S10. If the detected speed is less than or equal to this maximum desired speed, processing returns to step S10.

If, however, the detected vehicle speed exceeds the maximum desired speed at the current gear position, processing proceeds to step S50 shown in FIG. 6B. In step S50, the ECU 210 instructs the accelerator pedal control mechanism 520 to release the accelerator pedal. Then, in step S55, the ECU 210 instructs the clutch control mechanism 510 to depress the clutch pedal.

In step S60, the ECU 210 instructs the shift control mechanism 500 to up-shift the manual transmission. Next, in step S65 the ECU 210 instructs the clutch control mechanism 510 to release the clutch pedal, and in step S70, instructs the accelerator pedal control mechanism 522 to depress the accelerator pedal. Processing then returns to step S10.

Returning to step S35, if the target speed is less then or equal to the current vehicle speed, then in step S80, the ECU 210 instructs the accelerator pedal control mechanism 520 to release the accelerator pedal. In step S85, the ECU 210 inputs the output from the vehicle speed sensor 550, and determines whether the detected vehicle speed is less than a predetermined minimum desired speed at the gear position detected in step S10. If the detected vehicle speed is greater than or equal to this minimum desired speed, then processing returns to step S10. Both the predetermined minimum and maximum desired speed values for each gear position are empirically determined values stored by the ECU 210.

If, however, the detected vehicle speed is less then the minimum desired speed, the ECU 210 instructs the accelerator pedal control mechanism 520 to release the accelerator pedal in step S90 shown in FIG. 6C. Next, in step S95, the ECU 210 instructs the clutch control mechanism 510 to depress the clutch pedal, and in step S100 instructs the shift control mechanism 500 to down-shift the manual transmission. Afterwards, the ECU 210 instructs the clutch control mechanism 510 to release the clutch pedal in step S105, and then instructs, in step S110, the accelerator pedal control mechanism 520 to depress the accelerator pedal. Processing then returns to step S10.

The automatic shifting system according to the present invention alleviates from the driver the burden of having to operate a clutch pedal and a gear shift lever of a manual transmission. At the same time, since a manual transmission is utilized, the fuel consumption savings realized by a manual transmission as compared to an automatic transmission are also achieved. Furthermore, the automatic shifting system of the present invention is simple in structure, inexpensive to manufacture, and durable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift control mechanism for shifting a manual transmission of a vehicle, comprising:

a first pair of parallel shift rails respectively disposed on opposite sides of a manual gear shift lever for said manual transmission;

a second pair of parallel shift rails respectively disposed on opposite sides of said manual gear shift lever, said second pair of parallel shift rails being perpendicular to said first pair of parallel shift rails;

a first rotary shaft operationally connected to and moving said first pair of parallel shift rails;

a second rotary shaft operationally connected to and moving said second pair of parallel shift rails;

a first motor rotating said first rotary shaft; and a second motor rotating said second rotary shaft, said first and second pair of parallel shift rails being respectively driven by said first and second rotary shafts to move said manual gear shift lever.

2. The shift control mechanism of claim 1, further comprising:

a first sensing bar connected to and extending radially from said first rotary shaft;

a second sensing bar connected to and extending radially from said second rotary shaft;

a first plurality of photo-sensors disposed around said first rotary shaft and detecting passage of said first sensing bar; and a second plurality of photo-sensors disposed around said second rotary shaft and detecting passage of said second sensing bar.

3. The shift control mechanism of claim 1, further comprising:

an electronic control unit controlling operation of said first and second motors.

4. A driverless vehicle operating system for controlling operation of a vehicle equipped with a manual transmission, comprising:

a shift control mechanism for moving a manual gear shift lever of said manual transmission;

a clutch control mechanism controlling operation of a clutch, which operationally connects said manual transmission and an engine of said vehicle;

an accelerator pedal control mechanism controlling operation of an accelerator pedal of said vehicle;

an operator input device receiving operator input indicative of a user selected target vehicle speed;

an engine speed sensor sensing a speed of said engine;

a vehicle speed sensor sensing a speed of said vehicle; and an electronic control unit receiving input from said shift control mechanism, said clutch control mechanism, said accelerator pedal control mechanism, said operator input device, said engine speed sensor and said vehicle speed sensor, and controlling said shift control mechanism, said clutch control mechanism, and said accelerator pedal control mechanism based on said received input so that the vehicle attains the selected target vehicle speed.

5. The driverless vehicle operating system of claim 4, wherein said shift control mechanism comprises:

a first pair of parallel shift rails respectively disposed on opposite sides of said manual gear shift lever of said manual transmission;

a second pair of parallel shift rails respectively disposed on opposite sides of said manual gear shift lever, said second pair of parallel shift rails being perpendicular to said first pair of parallel shift rails;

a first rotary shaft operationally connected to and moving said first pair of parallel shift rails;

a second rotary shaft operationally connected to and moving said second pair of parallel shift rails;

a first motor rotating said first rotary shaft; and a second motor rotating said second rotary shaft.

6. The driverless vehicle operating system of claim 5, wherein said shift control mechanism further comprises:

a first sensing bar connected to and extending radially from said first rotary shaft;

a second sensing bar connected to and extending radially from said second rotary shaft;

a first plurality of photo-sensors disposed around said first rotary shaft, detecting passage of said first sensing bar, and outputting detection signals to said electronic control unit; and a second plurality of photo-sensors disposed around said second rotary shaft, detecting passage of said second sensing bar, and outputting detection signals to said electronic control unit.

7. The driverless vehicle operating system of claim 5, wherein said electronic control unit controls operation of said first and second motors.

8. The driverless vehicle operating system of claim 4, wherein said electronic control unit compares said target vehicle speed to a current vehicle speed detected by said vehicle speed sensor, and controls said shift control mechanism, said clutch control mechanism, and said accelerator pedal control mechanism based on said comparison.

9. The driverless vehicle operating system of claim 8, wherein said electronic control unit determines if said target vehicle speed is greater than or less than said current vehicle speed, controls said accelerator pedal control mechanism to depress said accelerator pedal if said target vehicle speed is greater than said current vehicle speed, and controls said accelerator pedal control mechanism to release said accelerator pedal if said target vehicle speed is less than said current vehicle speed.

10. The driverless vehicle operating system of claim 9, wherein said electronic control unit determines a current gear position of said manual transmission based on output from said vehicle speed sensor and said engine speed sensor, controls said shift control mechanism and said clutch control mechanism to up-shift said manual transmission if said current vehicle speed is greater than a predetermined maximum vehicle speed for said current gear position, and controls said shift control mechanism and said clutch control mechanism to down-shift said manual transmission if said current vehicle speed is less than a predetermined minimum vehicle speed for said current gear position.

11. The driverless vehicle operating system of claim 8, wherein said electronic control unit determines a current gear position of said manual transmission based on output from said vehicle speed sensor and said engine speed sensor, controls said shift control mechanism and said clutch control mechanism to up-shift said manual transmission if said current vehicle speed is greater than a predetermined maximum vehicle speed for said current gear position, and controls said shift control mechanism and said clutch control mechanism to down-shift said manual transmission if said current vehicle speed is less than a predetermined minimum vehicle speed for said current gear position.

12. A method of controlling operation of a vehicle equipped with a manual transmission, comprising:

(a) receiving operator input;

(b) sensing a speed of an engine of said vehicle;

(c) sensing a speed of said vehicle;

(d) receiving input from a shift control mechanism, a clutch control mechanism, and an accelerator pedal control mechanism; and (e) controlling said shift control mechanism, said clutch control mechanism, and said accelerator pedal control mechanism based on output from said steps (a)–(d), said step (a) comprises receiving a target vehicle speed as said operator input, said step (e) including the sub-steps of (e1) comparing said target vehicle speed to a current vehicle speed sensed in said step (c), and (e2) controlling said shift control mechanism, said clutch control mechanism, and said accelerator pedal control mechanism based on the comparison of said sub-step (e1).

13. The method of claim 12, wherein said shift control mechanism includes a first pair of parallel shift rails respectively disposed on opposite sides of a manual gear shift lever for said manual transmission, a second pair of parallel shift rails respectively disposed on opposite sides of said manual gear shift lever for said manual transmission, said second pair of parallel shift rails being perpendicular to said first pair of parallel shift rails, a first rotary shaft operationally connected to said first pair of parallel shift rails, a second rotary shaft operationally connected to said second pair of parallel shift rails, a first motor rotating said first rotary shaft, a second motor rotating said second rotary shaft, a first sensing bar connected to and extending radially from said first rotary shaft, a second sensing bar connected to and extending radially from said second rotary shaft, a first plurality of photo-sensors disposed around said first rotary shaft, detecting passage of said first sensing bar, and outputting detection signals, and a second plurality of photo-sensors disposed around said second rotary shaft, detecting passage of said second sensing bar, and outputting detection signals, said step (d) comprises receiving said detection signals.

14. The method of claim 12, wherein said shift control mechanism includes a first pair of parallel shift rails respectively disposed on opposite sides of a manual gear shift lever for said manual transmission, a second pair of parallel shift rails respectively disposed on opposite sides of said manual gear shift lever for said manual transmission, said second pair of parallel shift rails being perpendicular to said first pair of parallel shift rails, a first rotary shaft operationally connected to said first pair of parallel shift rails, a second rotary shaft operationally connected to said second pair of parallel shift rails, a first motor rotating said first rotary shaft, and a second motor rotating said second rotary shaft, said step (e) comprises controlling operation of said first and second motors.

15. The method of claim 12, wherein said step (e2) comprises the sub-steps of:

(e21) determining if said target vehicle speed is greater than or less than said current vehicle speed;

(e22) controlling said accelerator pedal control mechanism to depress said accelerator pedal if said target vehicle speed is greater than said current vehicle speed; and (e23) controlling said accelerator pedal control mechanism to release said accelerator pedal if said target vehicle speed is less than said current vehicle speed.

16. The method of claim 15, wherein said step (e2) further comprises the sub-steps of:

(e24) determining a current gear position of said automatic transmission based on output from said steps (b) and (c);

(e25) controlling said shift control mechanism and said clutch control mechanism to up-shift said manual transmission if said current vehicle speed is greater than a predetermined maximum vehicle speed for said current gear position; and (e26) controlling said shift control mechanism and said clutch control mechanism to down-shift said manual transmission if said current vehicle speed is less than a predetermined minimum vehicle speed for said current gear position.

17. The method of claim 12, wherein said step (e2) comprises the sub-steps of:

(e21) determining a current gear position of said manual transmission based on output from said steps (b) and (c);

(e22) controlling said shift control mechanism and said clutch control mechanism to up-shift said manual transmission if said current vehicle speed is greater than a predetermined maximum vehicle speed for said current gear position; and (e23) controlling said shift control mechanism and said clutch control mechanism to down-shift said manual transmission if said current vehicle speed is less than a predetermined minimum vehicle speed for said current gear position.

18. The shift control mechanism of claim 1, wherein said first rotary shaft moves said first pair of parallel shift rails along a first direction and said second rotary shaft moves said second pair of parallel shift rails along a second direction, the first direction being perpendicular to said second direction.

19. A shift control mechanism for shifting a manual transmission of a vehicle comprising:

a first pair of parallel shift rails respectively disposed on opposite sides of a manual gear shift lever of said manual transmission for moving the manual gear shift lever along a first direction;

a second pair of parallel shift rails respectively disposed on opposite sides of the manual gear shift lever for moving the manual gear shift lever along a second direction perpendicular to the first direction, said first pair of parallel shift rails being perpendicular to said second pair of parallel shift rails; and an electronic controller for controlling movement of said first and second parallel shift rails in accordance with a user selected target vehicle speed.

20. The shift control mechanism of claim 20, further comprising:

a first rotary shaft operationally coupled to said first pair of parallel shift rails;

a second rotary shaft operationally coupled to said second pair of parallel shift rails;

a first motor rotating said first rotary shaft; and a second motor rotating said second rotary shaft, said electronic controller selectively actuating said first and second motors to respectively drive said first and second rotary shafts to move said first and second pairs of parallel shift rails, thereby moving the manual gear shift lever to shift the manual transmission in accordance with the user selected target vehicle speed.

* * * * *